(No Model.)
J. A. ALLEN.
ANIMAL TRAP.
No. 591,719. Patented Oct. 12, 1897.
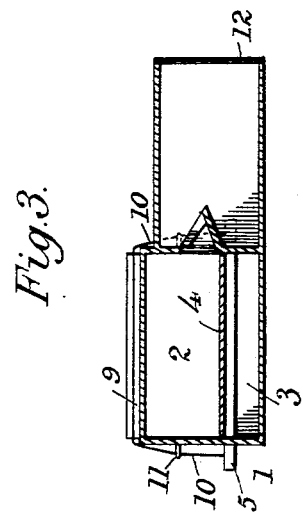
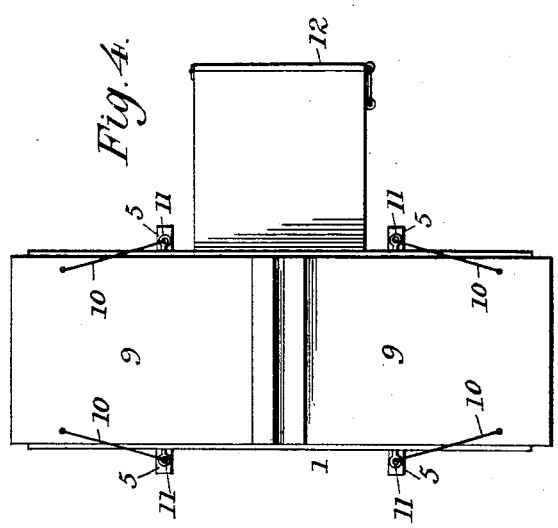
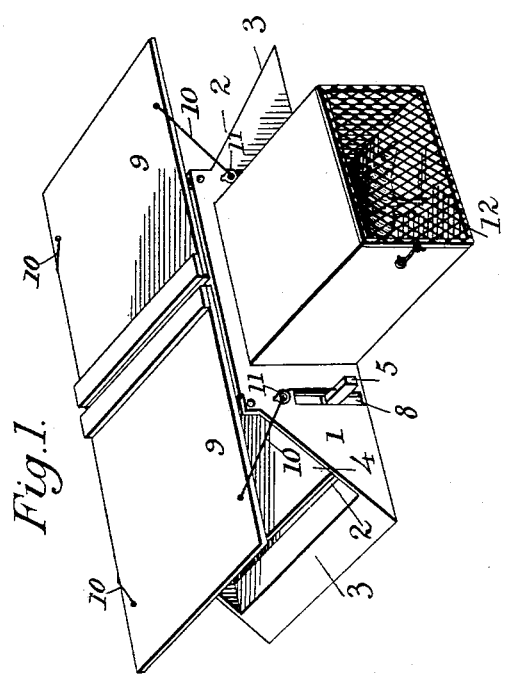
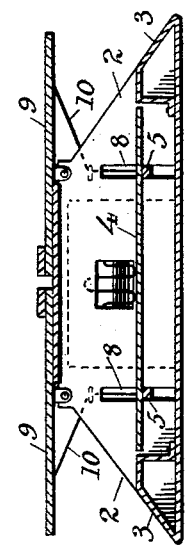
Witnesses:
J. S. Bowen
J. Albert Willson
Inventor:
James A. Allen,
by H. B. Willson
Attorney

UNITED STATES PATENT OFFICE.

JAMES A. ALLEN, OF SOUTH ARM, MICHIGAN.

ANIMAL-TRAP.

SPECIFICATION forming part of Letters Patent No. 591,719, dated October 12, 1897.

Application filed May 28, 1897. Serial No. 638,563. (No model.)

*To all whom it may concern:*

Be it known that I, JAMES A. ALLEN, a citizen of the United States, residing at South Arm, in the county of Charlevoix and State of Michigan, have invented certain new and useful Improvements in Animal-Traps; and I do declare the following to be a full, clear, and exact description of the invention, such as will enable others skilled in the art to which it appertains to make and use the same.

My invention has relation to animal-traps; and the object is to provide a device of this character which shall be simple of construction, durable in use, and comparatively inexpensive of production, and which will, after the animal has been entrapped, reset itself.

With these objects in view the invention consists of certain features of construction and combination of parts which will be hereinafter fully set forth.

In the accompanying drawings, Figure 1 is a perspective view of my improved trap, showing it set. Fig. 2 is a longitudinal sectional view. Fig. 3 is a similar view at right angles to Fig. 2, and Fig. 4 is a top plan view.

In said drawings, 1 denotes the frame of the trap, consisting of a casing having open ends 2, with inclined foot-boards 3.

Secured to one side of the casing and communicating therewith is a compartment which, for convenience of reference, I will term a "prison." This compartment is provided with a hinged door of open-work material, preferably formed of wire, the construction of which is such that an animal may pass from the casing into the prison, but when once within the prison cannot return again to the casing.

4 denotes the movable platform or floor of the casing, and 5 denotes two rods which are connected to the bottom of this platform or floor at its ends and project through vertical slots 8, formed in the sides of the casing.

9 denotes hinged doors which are hinged to the upper or top piece of the casing and are connected with the ends of the rods by means of cords 10, that pass through eyes 11, secured to the casing above the vertical slots therein. The upper ends of these doors are weighted so that normally they remain in the position shown in Fig. 1, but when an animal enters the casing the weight of said animal will be sufficient to lower the floor, and this will cause the door to be closed and remain closed as long as the animal is upon the floor. The animal, seeing no chance of escape through either of the entrances to the casing, will invariably pass from the casing into the prison, and as soon as his weight is removed from the floor the weighted upper ends of the door will open the same and raise the floor, thus resetting the trap.

The prison is provided with a door 12, which will permit of the animal being removed from the prison.

From the foregoing description, taken in connection with the accompanying drawings, the construction and operation of the invention will be readily understood without requiring an extended explanation.

The device is entirely automatic in its operation, and, being simple of construction, the parts are not liable to get out of order.

Although I have specifically described the construction and relative arrangement of the several elements of my invention, I do not desire to be confined to the same, as such changes or modifications may be made as clearly fall within the scope of my invention without departing from the spirit thereof.

Having thus described my invention, what I claim, and desire to secure by Letters Patent, is—

A trap comprising a casing having inclined foot-boards, and provided with a prison having an inwardly-opening door, a movable floor for said casing provided with rods that project through vertical slots in the side of the casing, doors hinged to the upper side of the casing and provided with weights which normally hold the doors open and the floor elevated, and cords connected to the rods and to the doors and passing through eyes secured in the sides of the casing above the slots, whereby when the weight of the animal is placed upon the floor, it will lower the doors and close the entrance to said casing, substantially as set forth.

In testimony whereof I hereunto affix my signature in presence of two witnesses.

JAMES A. ALLEN.

Witnesses:
 ARTHUR WARD,
 FRED E. BORSINGER.